Nov. 1, 1955 W. D. KELLY 2,722,678
LIQUID LEVEL INDICATING MEANS
Filed Aug. 3, 1953 2 Sheets-Sheet 1
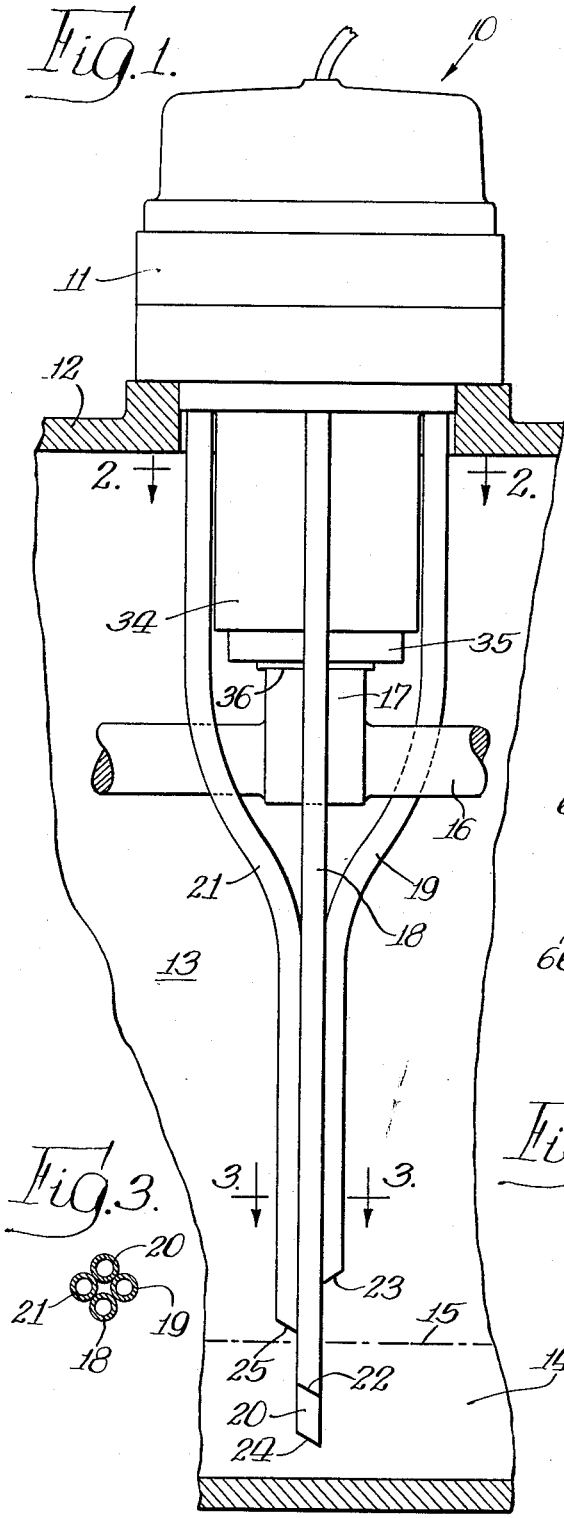
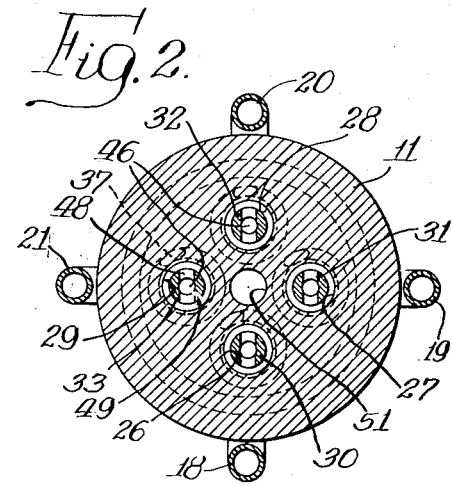
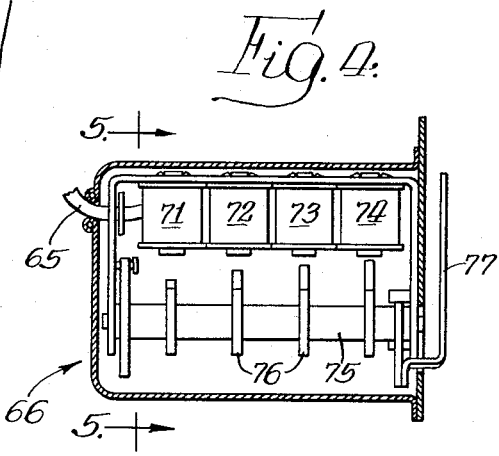
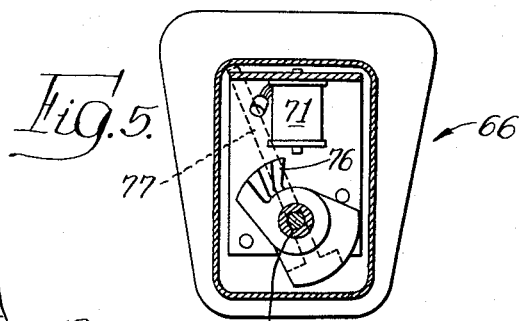
INVENTOR.
William D. Kelly,
BY Schroeder, Merriam,
Hofgren & Brady Attys.

Nov. 1, 1955  W. D. KELLY  2,722,678
LIQUID LEVEL INDICATING MEANS
Filed Aug. 3, 1953  2 Sheets-Sheet 2
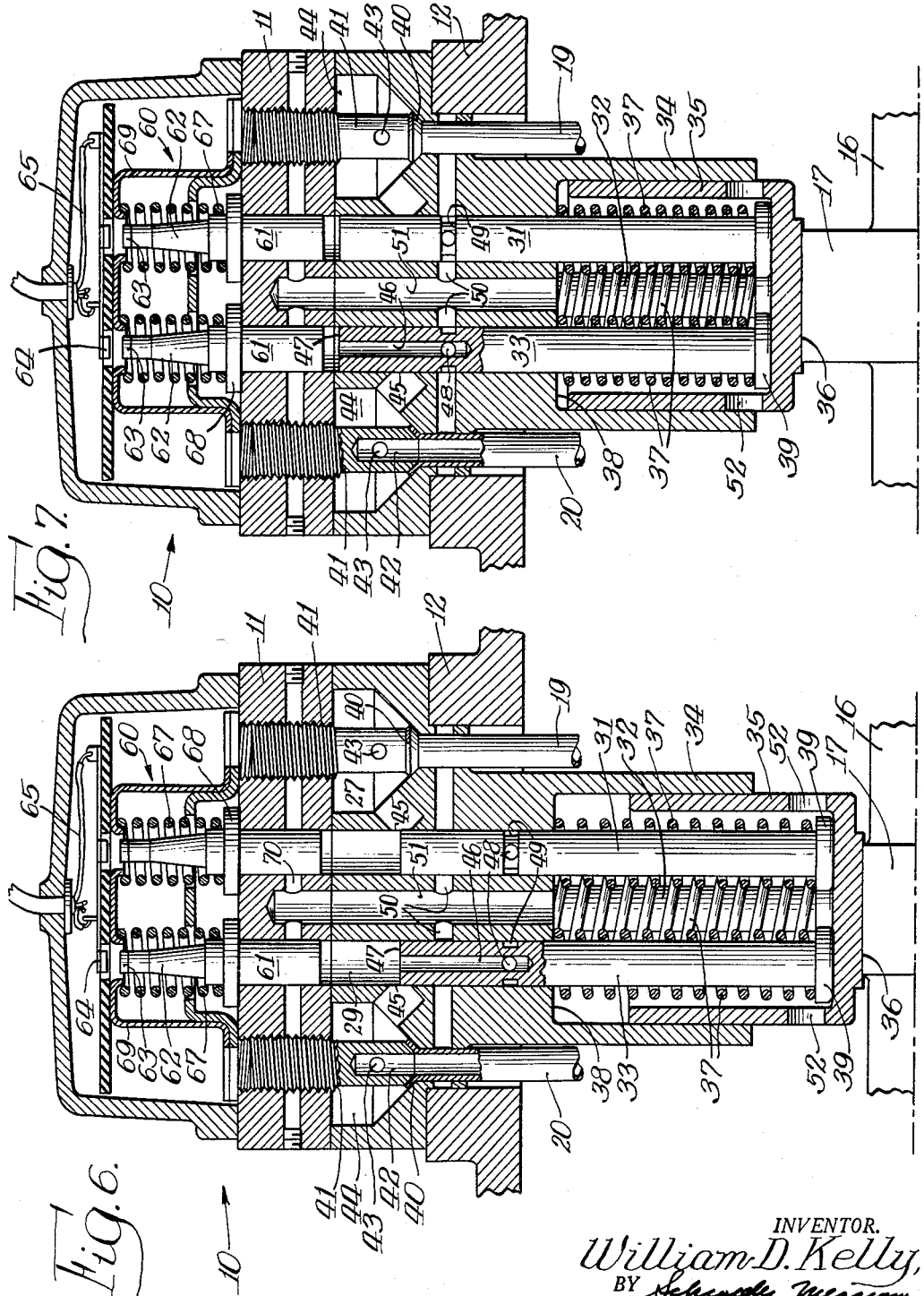
INVENTOR.
William D. Kelly,
BY Schroeder, Merriam,
Hofgren & Brady
Atty's.

United States Patent Office 2,722,678
Patented Nov. 1, 1955

2,722,678

LIQUID LEVEL INDICATING MEANS

William D. Kelly, Western Springs, Ill.

Application August 3, 1953, Serial No. 371,845

14 Claims. (Cl. 340—244)

This invention relates to liquid level indicating means and more particularly to apparatus for providing a constant indication of the level of liquid in a container.

It is the general object of this invention to produce a new and improved liquid level indicating means.

It is a more specific object of the present invention to provide an apparatus for giving a constant indication of the level of liquid in a container.

One of the features of the present invention is the provision of a liquid level indicating means which includes a plurality of pumping means, each having an inlet placed at a different level in the container so that certain of the inlets are above and others are below the level of liquid in the container, together with means responsive to the presence of liquid or to flow of liquid through the pumps to give a signal as to the liquid level by sensing which of the pump inlets are and which of the pump inlets are not above the liquid level.

A further object of the invention is to provide a liquid level indicating device particularly adapted to give a constant visual indication of the level of oil in the crankcase of an engine.

Other and further objects and advantages of the invention will be readily apparent from the following description and drawings, in which:

Fig. 1 is an elevational view showing a portion of the crankcase of an engine with the apparatus of this invention secured thereto;

Fig. 2 is a horizontal section along line 2—2 of Fig. 1;

Fig. 3 is a horizontal section along line 3—3 of Fig. 1;

Fig. 4 is a view of the indicating mechanism of the invention;

Fig. 5 is a view taken along line 5—5 of Fig. 4;

Fig. 6 is a vertical sectional view showing the details of the mechanism of this invention; and Fig. 7 is a view like Fig. 6 showing the apparatus in a changed position.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The need for an operative device to give a constant indication of the level of liquid in a container has long been felt. The need is particularly acute in the operation of engines such as found in automobiles for giving a constant indication of the oil level in the crankcase of the engine. At the present time the normal car is equipped with a dip-stick which requires that the automobile and engine be stopped and the hood lifted before a reading can be obtained. Devices for giving intermittent indications of the level of oil in the crankcase even when the engine is running are shown in my copending applications Serial Nos. 319,265 and 335,305 filed September 18, 1952, and February 5, 1953, respectively. In the above mentioned applications, however, specific means are not provided for giving constant indication of oil level such as may be accomplished by the present invention.

Broadly speaking the apparatus of the invention comprises a plurality of pumps, each having an inlet located at a different level in the crankcase, together with means for constantly operating the pump when the engine is running. Fluid is drawn into and through each of the pumps, with the fluid being air for those pumps whose inlet is located above the liquid level and oil for those pumps whose inlet is located below the liquid level. Preferably the pumps are piston pumps and draw fluid therethrough on their intake strokes and apply pressure on the fluid during their return strokes. If the fluid is air the pressures generated on the return strokes are relatively small, while if the fluid is oil the pressures generated are relatively high because of the incompressibility of the liquid. Means are provided for sensing the pressures generated in the pump which are responsive to the larger pressure generated in the cylinders containing oil, with the pressure responsive means serving to generate a signal in response to the increased pressure. Means are also provided for cumulating the signals generated so as to provide a final visual indication of the oil level.

The specific embodiment of the invention chosen for purposes of illustration comprises the apparatus generally indicated at 10 which includes a casing 11 to be secured to a portion 12 of the crankcase 13 of an engine. Oil indicated at 14 is normally present in the bottom of the crankcase which, in Fig. 1, is shown to have a level at 15. Also located in the crankcase is a cam shaft 16 having a special cam 17 thereon for purposes which will hereafter become apparent.

A plurality of fluid passages 18, 19, 20 and 21 extend downwardly from the casing 11 into the crankcase 13, with each of the passages having inlets 22, 23, 24 and 25 opening into the crankcase at different levels.

As best seen in Figs. 6 and 7, a pluality of cylinders 26, 27, 28 and 29 are formed in the casing 11, with pistons 30, 31, 32 and 33 being reciprocable in the cylinders.

Means are provided for transmitting power from the cam shaft to the pistons to reciprocate the same, and for this purpose the lower portion of the casing 11 terminates in a skirt portion 34 which reciprocably carries a cup-shaped member 35 having a lower follower surface 36 riding on the cam 17. A plurality of springs 37 are provided for moving the pistons on their return strokes, there being a spring surrounding the lower end of each of the pistons. One end of the springs bears against the undersurface 38 of the casing while the other end of the springs bears against an enlarged head portion 39 formed on the lower end of each piston.

The passages 18–21 each terminate in an upper flared end portion 40 against which is seated the lower tapered end of a fitting 41 threadedly received in the casing, with the fitting having an axial opening 42 in alignment with the opening in the passages, together with a side opening 43 opening into a chamber 44 formed in the casing. Each chamber 44 communicates with a different one of the cylinders by means of ports 45.

When the engine is running, and hence the cam shaft is rotating, the cam 17 in cooperation with the springs 37 serves to move the cup member 35 upwardly and downwardly and hence reciprocate each of the pistons. As the pistons move downwardly on their intake strokes a partial vacuum is created in each of the cylinders, which vacuum is destroyed when the pistons move downwardly to the position shown in Fig. 6 uncovering the ports 45. The vacuum in the cylinders is then transferred into the chambers 44 and the passages 18–21 so as to draw either air or oil into the cylinders, depending upon whether the inlets of the passages are above or below the oil level 15. On the upward movement of the pistons to the position shown in Fig. 7, pressure is generated within the cylinders, with the amount of pressure being of course dependent upon whether liquid or fluid has been drawn thereinto. When the pistons reach the end of the discharge strokes, as illustrated in Fig. 7, communication is established between the cylinders and the interior of the crankcase by means of a by-pass passage 46 formed in each piston and opening at one end to the pressure side 47 of each cylinder and at its other end to a side passage 48 communicating with an annular groove 49 formed in each piston. With the pistons in the position shown in Fig. 7, it will be noted that the annular grooves 49 communicate with a by-pass passageway 50 formed in the casing which in turn communicates with a central by-pass passageway 51 opening at its lower end to the interior of the cup member 35 and thence to the crankcase through the medium of openings 52 formed in the lower portion of the cup.

As previously noted, pressure responsive signaling means are provided for giving an indication of oil level depending upon the pressures generated within the cylinders. Such pressure responsive signaling means, generally designated at 60, include a cylindrical member 61 movably mounted in the upper portion of each of the cylinders and closing the upper ends thereof. The members 61 are provided with an upper tapered portion 62 exterior of the cylinder, which tapered portion carries a first contact 63 adapted to be moved against a second contact 64 to establish an electrical connection which is transmitted to an indicating device 66 by means of the lead 65. A spring 67 surrounds each of the tapered portions 62 and has one end bearing against a collar 68 formed at the lower part of each tapered portion, with the other end of the springs bearing against the upper portion of a cover cap 69.

The springs 67 are so proportioned as to hold the member 61 against movement when only air is compressed within the cylinders. Thus, when the inlet passageway associated with any particular cylinder is above the oil level, and thus only air is drawn into the cylinder on its intake stroke, movement of the piston thereon on its discharge stroke serves to compress the air but with insufficient force to move the member 61 against the tension of the associated spring 67. As previously noted, at the end of the discharge stroke such compressed air is released back into the crankcase through the bypass passageways 46—51. However, if oil is drawn into the cylinder on the intake stroke of the piston, the upward movement of the piston is transmitted to the member 61 located in its cylinder as oil is incompressible. The springs 67 do not restrain the member 61 against movement when oil is contained within the cylinder and thus the members are moved upwardly so as to make contact between a pair of contacts 63 and 64.

Thus, it may be seen that as many as four or as little as no electrical contacts will be made during each reciprocation of the pistons, and thus none up to four signals will be generated, in the particular embodiment illustrated, upon each such reciprocation. Means are provided for cumulating the signals so generated so as to give an indication of the level of liquid in the crankcase.

For this purpose the indicating device 66 comprises a plurality of electrical coils 71, 72, 73 and 74, each connected to be energized by a different pair of contacts 63 and 64. The indicating device also includes an armature shaft 75 carrying a plurality of armatures 76 each positioned adjacent one of the coils 71–74. An indicating needle 77 is secured to and rotated by the armature shaft 75 and may be associated with a suitably inscribed dial indicating various oil levels from full to low.

If the oil level is full all of the inlets 22–25 will be below the oil level in the crankcase and thus as oil is drawn into each of the cylinders, all of the pairs of contacts 63 and 64 will be operated during each stroke of the piston and thus all of the coils 71–74 will be energized, moving the armature shaft to its fullest extent indicating "full." Should the oil level drop to the point indicated in Fig. 1 where inlets 23 and 25 are above the level while inlets 22 and 24 are below, only two of the pairs of contacts would be brought together as only two of the cylinders would be filled with oil during reciprocation of the pistons. Thus, only the coils 73 and 74 would be energized, rotating the shaft 75 and hence the needle 77 through one half of its full swing. The contact between any two pairs of contacts associated with a cylinder whose inlet passage is submerged is brief but constantly repeated as long as the engine is running. A light return spring may be provided for the needle 77 and the inertia of the instrument parts can be proportioned to prevent objectionable fluttering of the needle. Thus, preferably the electromagnetic force of each of the coils and rotary armature is considerably greater than the counterforce of a return spring. Furthermore, as the pumps utilize but small quantities of oil at each stroke and the intake passages 18–21 may be of considerable length, the surging of oil in the crankcase is averaged out.

From the foregoing it will be appreciated that there has been provided a relatively simple yet completely suitable device for providing a constant indication of oil level in the crankcase of an internal combustion engine or, for that matter, of the liquid level in any form of container.

I claim:

1. Apparatus for providing a constant indication of the liquid level in a container comprising a plurality of pumps, an inlet for each pump with each inlet opening into said container at a different level, means for operating each of said pumps to cause liquid to flow through each pump the inlet of which is below the liquid level, an indicating device, and means responsive to the flow of liquid through said pumps for operating said indicating means in accordance with the number of pumps through which liquid flows.

2. Apparatus for providing a constant indication of the liquid level in a container comprising a plurality of pumps, an inlet for each pump with each inlet opening into said container at a different level, means for operating each of said pumps to cause liquid to flow through each pump the inlet of which is below the liquid level, means associated with each pump and operative to create a signal in response to flow of liquid therethrough, and means for cumulating the signals received from said signal creating means.

3. Apparatus for providing a constant indication of the liquid level in a container comprising a plurality of pumps, an inlet for each pump with each inlet opening into said container at a different level, means for operating each of said pumps to cause liquid to be drawn into each pump the inlet of which is below the liquid level, means associated with each pump and operative to create a signal in response to the presence of liquid therein, means for cumulating the signals received from said signal creating means, and an indicating device operated by said cumulating means to provide a visual indication of the cumulated signals.

4. Apparatus for providing a constant indication of the liquid level in a container comprising a plurality of pumps, an inlet for each pump with each inlet opening into said container at a different level, means for constantly operating each of said pumps to cause liquid to be drawn into each pump the inlet of which is below the liquid level, means associated with each pump and operative to create a signal in response to the presence of liquid therein, an indicating device, and means responsive to the presence of liquid in said pumps for operating said indicating means in accordance with the number of pumps in which liquid is present.

5. Apparatus for providing a constant indication of the oil level in the crankcase of an internal combustion engine comprising a plurality of vacuum producing devices, an inlet for each device with each inlet opening into said crankcase at a different level, means connecting said devices to the engine for constantly operating each of said devices during operation of the engine to cause oil to be drawn into each device the inlet of which is below the oil level, and means associated with each device and operative to create a signal in response to the presence of oil therein.

6. Apparatus for providing a constant indication of the liquid level in a container comprising a casing, a plurality of cylinders in the casing, a piston reciprocable in each cylinder, a plurality of fluid passages each opening at one end to a different one of said cylinders and each having an inlet at the other end opening into said container at a different level, means for reciprocating said pistons to draw fluid into said cylinders on one side of the piston therein upon movement of the piston in one direction, said fluid being air for those cylinders whose associated passage inlet is above the liquid level and being liquid for those cylinders whose associated passage inlet is below the liquid level, pressure responsive signaling means associated with each cylinder and movable under the pressure generated in a cylinder upon movement of a piston in the other direction to create a signal, and means restraining said pressure responsive means against movement under the pressure generated in a cylinder containing air and permitting movement of said pressure responsive means under the pressure generated in a cylinder containing liquid.

7. Apparatus for providing a constant indication of the liquid level in a container comprising a casing, a plurality of cylinders in the casing, a piston reciprocable in each cylinder, a plurality of fluid passages each opening at one end to a different one of said cylinders and each having an inlet at the other end opening into said container at a different level, means for reciprocating said pistons to draw fluid into said cylinders on one side of the piston therein upon movement of the piston in one direction, said fluid being air for those cylinders whose associated passage inlet is above the liquid level and being liquid for those cylinders whose associated passage inlet is below the liquid level, pressure responsive signaling means closing the end of each cylinder opposing said side of the piston therein, each pressure responsive means being movable under the pressure generated in a cylinder upon movement of a piston in the other direction to create a signal, and means restraining said pressure responsive means against movement under the pressure generated in a cylinder containing air and permitting movement of said pressure responsive means under the pressure generated in a cylinder containing liquid.

8. Apparatus for providing a constant indication of the liquid level in a container comprising a plurality of piston and cylinder devices, a plurality of fluid passages each opening at one end to a different one of said cylinders and each having an inlet at the other end opening into said container at a different level, means for reciprocating said pistons to draw fluid into said cylinders on one side of the piston therein upon movement of the piston in one direction, said fluid being air for those cylinders whose associated passage inlet is above the liquid level and being liquid for those cylinders whose associated passage inlet is below the liquid level, pressure responsive signaling means associated with each cylinder and movable under the pressure generated in a cylinder upon movement of a piston in the other direction to create a signal, and means restraining said pressure responsive means against movement under the pressure generated in a cylinder containing air and permitting movement of said pressure responsive means under the pressure generated in a cylinder containing liquid.

9. Apparatus for providing a constant indication of the liquid level in a container comprising a casing, a plurality of cylinders in the casing, a piston reciprocable in each cylinder, a plurality of fluid passages each opening at one end to a different one of said cylinders and each having an inlet at the other end opening into said container at a different level, means for reciprocating said pistons to draw fluid into said cylinders on one side of the piston therein upon movement of the piston in one direction, said fluid being air for those cylinders whose associated passage inlet is above the liquid level and being liquid for those cylinders whose associated passage inlet is below the liquid level, pressure responsive signaling means associated with each cylinder and movable under the pressure generated in a cylinder upon movement of a piston in the other direction to create a signal, means restraining said pressure responsive means against movement under the pressure generated in a cylinder containing air and permitting movement of said pressure responsive means under the pressure generated in a cylinder containing liquid, and valve means for releasing the pressures generated in a cylinder upon termination of movement of a piston in said other direction.

10. Apparatus for providing a constant indication of the liquid level in a container comprising a casing, a plurality of cylinders in the casing, a piston reciprocable in each cylinder, a movable element in each cylinder and closing one end thereof, a plurality of fluid passages each opening at one end to a different one of said cylinders intermediate the ends thereof and each passage having an inlet at the other end opening into said container at a different level, means for reciprocating said pistons to draw fluid into said cylinders upon movement of the pistons therein in one direction, said fluid being air for those cylinders whose associated passage inlet is above the liquid level and being liquid for those cylinders whose associated passage inlet is below the liquid level, resilient means restraining said elements against movement upon movement of the pistons in the other direction under the pressure generated in cylinders containing air and permitting movement of said elements under the pressure generated in cylinders containing liquid, an electric switch for each element and operated upon movement thereof, and an electrically operated indicating device electrically connected to said switches and movable through a plurality of positions in accordance with the number of switches operated.

11. Apparatus for providing a constant indication of the liquid level in a container comprising a casing, a plurality of cylinders in the casing, a piston reciprocable in each cylinder, a movable element in each cylinder and closing one end thereof, a plurality of fluid passages each opening at one end to a different one of said cylinders intermediate the ends thereof and each passage having an inlet at the other end opening into said container at a different level, means for reciprocating said pistons to draw fluid into said cylinders upon movement of the pistons therein in one direction, said fluid being air for those cylinders whose associated passage inlet is above the liquid level and being liquid for those cylinders whose associated passage inlet is below the liquid level, resilient means restraining said elements against movement upon movement of the pistons in the other direction under the pressure generated in cylinders containing air and permitting movement of said elements under the pressure generated in cylinders containing liquid, an electric switch for each element and operated upon movement thereof, an electrically operated indicating device electrically connected to said switches and movable through a plurality of positions in accordance with the number of switches operated, and valve means for releasing the pressures generated in a cylinder upon each termination of movement of a piston in said other direction.

12. Apparatus for providing a constant indication of the liquid level in a container comprising a casing, a plurality of cylinders in the casing, a piston reciprocable in each cylinder, a movable element in each cylinder and closing one end thereof, a plurality of fluid passages each opening at one end to a different one of said cylinders intermediate the ends thereof and each passage having an inlet at the other end opening into said container at a different level, means for reciprocating said pistons to draw fluid into said cylinders upon movement of the pistons therein in one direction, said fluid being air for those cylinders whose associated passage inlet is above the liquid level and being liquid for those cylinders whose associated passage inlet is below the liquid level, resilient means restraining said elements against movement upon movement of the pistons in the other direction under the pressure generated in cylinders containing air and permitting movement of said elements under the pressure generated in cylinders containing liquid, an electric switch for each element and operated upon movement thereof, an electrically operated indicating device electrically connected to said switches and movable through a plurality of positions in accordance with the number of switches operated, a by-pass passageway in the casing opening at one end to the container and at the other end to a port in each of said cylinders, each port being located at a portion of the cylinder covered by the piston therein, and a cooperating by-pass passageway formed in each piston and opening at one end to the compression face of the pistons and at the other end through the side walls thereof to communicate with said ports upon each termination of movement of the pistons in said other direction.

13. Apparatus for providing a constant indication of the oil level in the crankcase of an engine having a cam shaft in the crankcase comprising a casing to be mounted on the engine, a plurality of cylinders in the casing, a piston reciprocable in each cylinder, a movable element in each cylinder and closing one end thereof, a plurality of fluid passages each opening at one end to a different one of said cylinders intermediate the ends thereof and each passage having an inlet at the other end opening into said crankcase at a different level, a cam follower supported on the casing and positioned to be in contact with the cam shaft, said cam follower being adapted to reciprocate the pistons upon rotation of the cam shaft to draw fluid into said cylinders upon movement of the pistons therein in one direction, said fluid being air for those cylinders whose associated passage inlet is above the oil level and being oil for those cylinders whose associated passage inlet is below the oil level, resilient means restraining said elements against movement upon movement of the pistons in the other direction under the pressure generated in cylinders containing air and permitting movement of said elements under the pressure generated in cylinders containing oil, an electric switch for each element and operated upon movement thereof, and an electrically operated indicating device electrically connected to said switches and movable through a plurality of positions in accordance with the number of switches operated.

14. Apparatus for providing a constant indication of the oil level in the crankcase of an engine having a cam shaft in the engine comprising a casing to be mounted on the engine, a plurality of cylinders in the casing, a piston reciprocable in each cylinder, a movable element in each cylinder and closing one end thereof, a plurality of fluid passages each opening at one end to a different one of said cylinders intermediate the ends thereof and each passage having an inlet at the other end opening into said crankcase at a different level, means connecting the pistons to the cam shaft to reciprocate the pistons with rotation of the shaft to draw fluid into said cylinders upon movement of the pistons in one direction, said fluid being air for those cylinders whose associated passage inlet is above the oil level and being oil for those cylinders whose associated passage inlet is below the oil level, resilient means restraining said elements against movement upon movement of the pistons in the other direction under the pressure generated in cylinders containing air and permitting movement of said elements under the pressure generated in cylinders containing oil, signaling means operated by movement of an element, and by-pass means in the casing for releasing the pressures generated in a cylinder upon each termination of movement of a piston in said other direction, said by-pass means including a first by-pass passageway connected with each cylinder and located at a portion thereof covered by the piston and a second by-pass passageway connected with each cylinder and located at a portion thereof covered by the member therein, means in the piston for establishing communication between the pressure side thereof and the first by-pass passageway upon termination of movement of a piston in said other direction with movement of an element under the pressures generated in a cylinder containing oil serving to establish communication between said second by-pass passageway and said cylinder.

References Cited in the file of this patent

UNITED STATES PATENTS

| | | |
|---|---|---|
| 1,308,223 | Camp | July 1, 1919 |
| 2,141,325 | Werder | Dec. 27, 1938 |
| 2,511,649 | Reiter | June 13, 1950 |
| 2,624,790 | White | Jan. 6, 1953 |